United States Patent
Andersson et al.

(10) Patent No.: US 7,922,194 B2
(45) Date of Patent: Apr. 12, 2011

(54) AIR-BAG COVER ARRANGEMENT

(75) Inventors: Stefan Andersson, Alingsås (SE); Johan Friberg, Linköping (SE)

(73) Assignee: Autoliv Development AB, Vargarda (SE)

( * ) Notice: Subject to any disclaimer, the term of this patent is extended or adjusted under 35 U.S.C. 154(b) by 16 days.

(21) Appl. No.: 12/514,371

(22) PCT Filed: Nov. 13, 2006

(86) PCT No.: PCT/SE2006/001276
§ 371 (c)(1),
(2), (4) Date: May 11, 2009

(87) PCT Pub. No.: WO2008/060193
PCT Pub. Date: May 22, 2008

(65) Prior Publication Data
US 2010/0038890 A1  Feb. 18, 2010

(51) Int. Cl.
*B60R 21/16* (2006.01)
(52) U.S. Cl. ....................................... 280/731
(58) Field of Classification Search .................. 280/731, 280/728.3
See application file for complete search history.

(56) References Cited

U.S. PATENT DOCUMENTS

| | | | |
|---|---|---|---|
| 5,826,901 A | 10/1998 | Adomeit | |
| 6,231,074 B1 | 5/2001 | Vian | |
| 6,426,473 B1 * | 7/2002 | Derrick et al. | 200/61.54 |
| 6,849,816 B2 * | 2/2005 | Rumpf | 200/61.54 |
| 7,261,317 B2 * | 8/2007 | Amamori | 280/731 |
| 7,540,530 B2 * | 6/2009 | Helmstetter | 280/731 |
| 2001/0030412 A1 * | 10/2001 | Igawa et al. | 280/728.2 |
| 2002/0125698 A1 * | 9/2002 | Schutz | 280/731 |
| 2002/0153714 A1 * | 10/2002 | Kreuzer | 280/731 |
| 2003/0197353 A1 * | 10/2003 | Suzuki et al. | 280/728.3 |
| 2005/0012310 A1 * | 1/2005 | Rhea | 280/731 |
| 2007/0045996 A1 * | 3/2007 | Frisch | 280/728.3 |

FOREIGN PATENT DOCUMENTS
GB   2336135 A   10/1999
* cited by examiner

*Primary Examiner* — Faye M. Fleming
(74) *Attorney, Agent, or Firm* — Harness, Dickey & Pierce, P.L.C.

(57) ABSTRACT

An air-bag cover arrangement is disclosed which comprises a moveable cover element (25) for covering an air-bag module (5), and design element (15) which is positioned adjacent the cover element. The design element has an overlapping part (16) which overlaps part of the cover element. The arrangement is characterised in that the cover element is moveable relative to the design element but is held by a stop element (18) in a rest position in which the cover element does not contact the overlapping part of the design element but rather a space from the design element.

14 Claims, 4 Drawing Sheets

PRIOR ART

AIR-BAG COVER ARRANGEMENT

CROSS-REFERENCE TO RELATED APPLICATIONS

This application is a 371 U.S. National Stage of International Application No. PCT/SE2006/001276, filed Nov. 13, 2006, published in English as WO 2008/060193 A1 on May 22, 2008. The disclosure of the above application is incorporated herein by reference.

DESCRIPTION OF INVENTION

THE PRESENT INVENTION relates to an air-bag cover arrangement, and more particularly relates to an air-bag cover arrangement to cover an air-bag module which is to be mounted to a steering wheel.

A steering wheel for a motor vehicle usually incorporates a moveable portion at its centre which may be pressed by a driver in order to sound the horn of the vehicle. It is important that there is no visible gap between the moveable portion and a fixed portion of the steering wheel adjacent the moveable portion, to ensure that the steering wheel has a neat appearance.

An air-bag module is often mounted within a central part of a steering wheel, with a cover portion of the air-bag module forming the moveable portion of the steering wheel. In order to avoid the presence of a visible gap between the cover of the air-bag module and a fixed design element adjacent the cover, it has been proposed previously for the edge of the design element to overlap the edge of the cover. An arrangement of this type has been proposed in US-A-2005/0012310.

Figure 1:
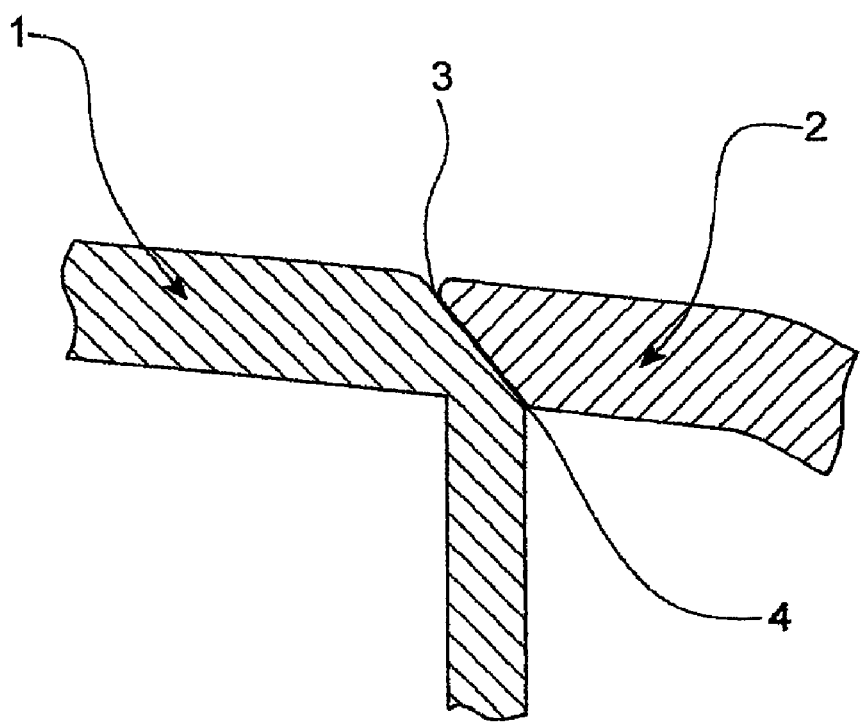

FIG. 1 shows the junction between a moveable air-bag cover 1 and an adjacent fixed design element 2 in a prior proposed arrangement. The corner of the air-bag cover 1 presents an angled face 3 which is contacted by a corresponding angled face 4 at the edge of the fixed design element 2. The edge of the design element 2 overlaps the corner of the air-bag cover 1 and the contact of the edge of the design element 2 with the air-bag cover 1 eliminates a gap between the design element 2 and the air-bag cover 1.

The air-bag cover 1 is biased upwardly (for example by springs) but configured to move downwardly, against the bias, when pressed to sound the horn of the vehicle. When the air-bag cover 1 is subsequently released it returns to its original position in which the air-bag cover 1 contacts the design element 2.

This prior proposed arrangement does not have a visible gap between the cover 1 and the design element 2 and hence this prior proposed arrangement is of a desirable appearance. However, there is a problem with this prior proposed arrangement whereby the edge of the design element 2 can become deformed by the air-bag cover 1 as a result of forces exerted by the air-bag cover 1 on the design element 2 over time. Deformation of the design element 2 spoils the appearance of the arrangement because the upper edge of the design element 2 is no longer aligned with the upper edge of the air-bag cover 1.

The present invention seeks to provide an improved air-bag cover arrangement.

According to the present invention, there is provided an air-bag cover arrangement comprising a moveable cover element for covering an air-bag module, and a design element positioned adjacent the cover element, the design element having an overlapping part which overlaps part of the cover element, characterised in that the cover element is moveable relative to the design element but held by a stop element in a rest position in which the cover element does not contact the overlapping part of the design element.

Preferably, the cover element is biased by a biasing arrangement in a direction towards the overlapping part of the design element but held against the bias in the rest position by the stop element.

Advantageously, the design element and the stop element are fixed to a housing of the air-bag module and the cover element is movably mounted to the housing, the stop element engaging the cover element to hold the cover element in the rest position.

Conveniently, the cover element comprises a generally planar cover portion and a side wall, the side wall extending substantially perpendicularly from one side of the cover portion at the periphery of the cover portion, the side wall being provided with an aperture through which the stop element extends, the stop element engaging part of the side wall which defines the edge of the aperture to hold the cover element in the rest position.

Preferably, the side wall incorporates a blocking member which protrudes substantially perpendicularly from the side wall at a position adjacent the design element, to block the cover element from moving past the overlapping part of the design element.

Advantageously, the cover element is fixed to an air-bag housing which is moveably mounted to a steering wheel, and the design element is a part of the steering wheel adjacent the air-bag module, the air-bag module being configured to move relative to the steering wheel when the cover element is moved relative to the design element, the stop element being defined by part of the steering wheel which engages part of the air-bag module to hold the air-bag module and the cover element in the rest position.

Conveniently, the air-bag module incorporates a blocking member which protrudes from a sidewall of the air-bag module at a position adjacent the design element, to block the cover element from moving past the overlapping part of the design element.

Preferably, one side of the cover element and one side of the design element together form a substantially continuous surface, the edge of the cover element and the edge of the design element each being angled relative to the continuous surface so that at least part of the angled edge of the design element forms the overlapping part of the design element which overlaps at least part of the angled edge of the cover element.

Advantageously, the edge of the cover element and the edge of the design element are each angled at between substantially 20 to 60 degrees relative to the continuous surface.

Conveniently, the overlapping part of the design element overlaps the part of the cover element by between substantially 0.5 mm to 5 mm when the cover element is in the rest position.

Preferably, a gap of between substantially 0.1 mm to 0.4 mm is present between the part of the cover element and the overlapping part of the design element when the cover element is in the rest position.

Advantageously, the cover element incorporates a split line which is configured to rupture upon actuation of the air-bag module to provide an opening in the cover element out of which an air-bag may inflate.

Conveniently, the cover element comprises a generally planar cover portion and the split line extends around the periphery of the cover portion.

Figure 2:
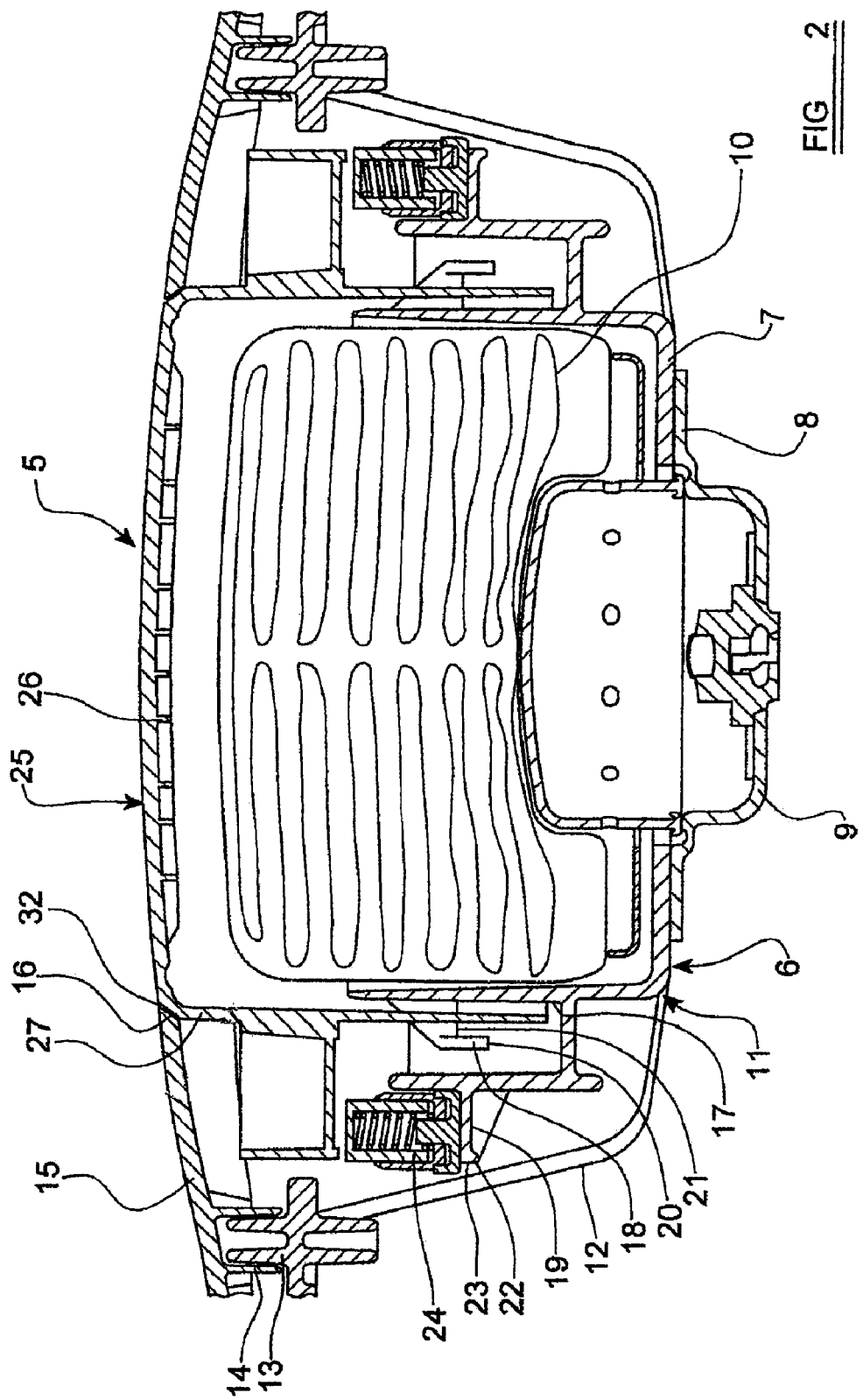
Figure 3:
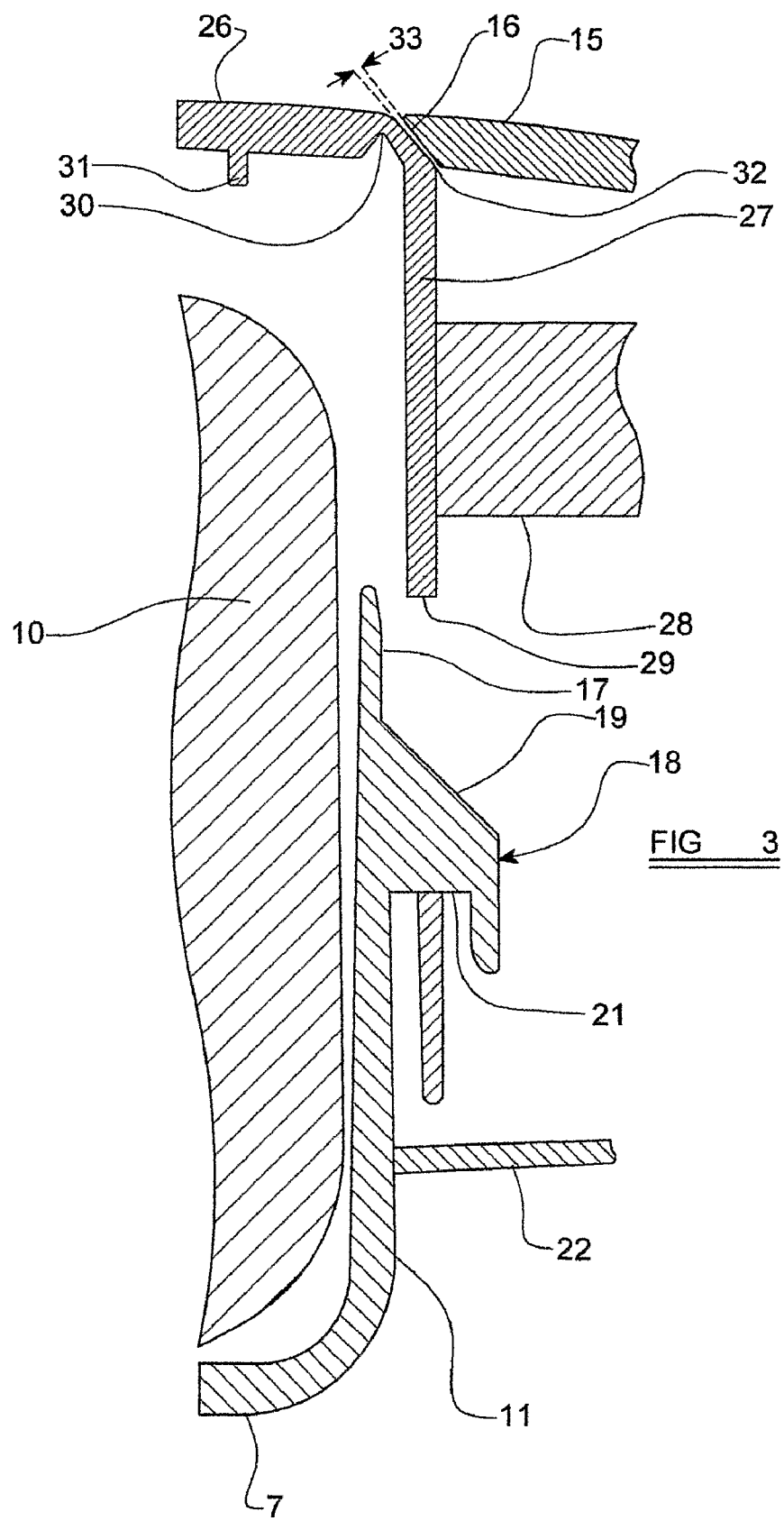
Figure 4:
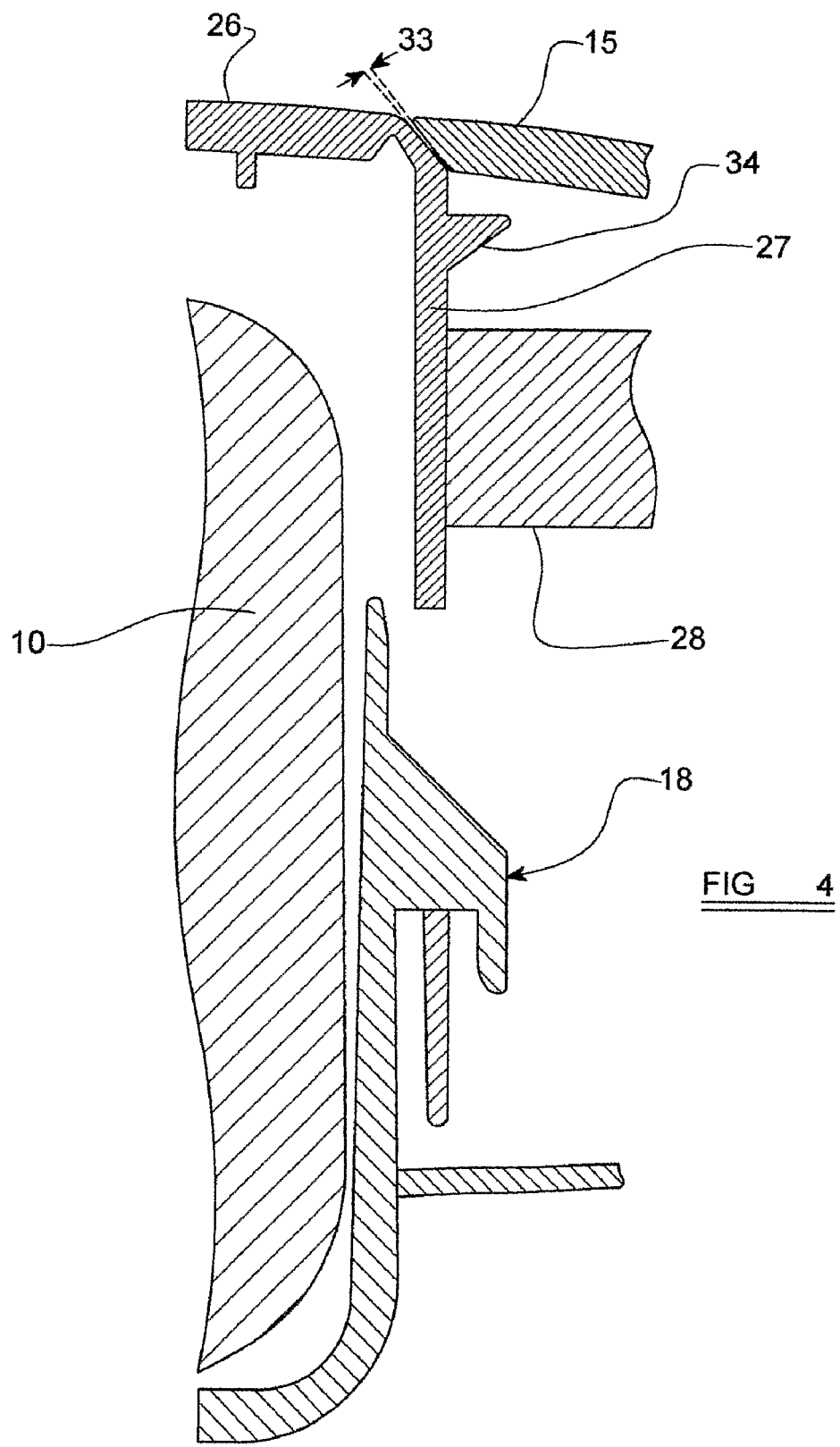

In order that the invention may be more readily understood, and so that further features thereof may be appreciated, embodiments of the invention will now be described, by way of example, with reference to the accompanying drawings in which:

FIG. 1 is a diagrammatic sectional view of part of a prior proposed air-bag cover arrangement, FIG. 2 is a diagrammatic sectional view of an air-bag module which incorporates an air-bag cover arrangement in accordance with a preferred embodiment of the invention, FIG. 3 is an enlarged view of a portion of the sectional view of FIG. 2 further illustrating a part of the air-bag cover arrangement of the preferred embodiment of the invention, and FIG. 4 is a sectional view similar to FIG. 3 illustrating a part of an air-bag cover arrangement in accordance with a further embodiment of the invention.

Referring now to FIGS. 2 and 3 of the accompanying drawings, an air-bag module 5 comprises a housing 6 which is of a plastics material. In other embodiments, however, the housing 6 may be of metal or of a combination of metal and plastics material.

The housing 6 has a planar base 7 of generally circular form which has an aperture 8 provided at its centre. A gas generator 9 is mounted to the base 7 so that part of the gas generator 9 protrudes through the aperture 8 and into the interior of the housing 6. An air-bag 10 is folded within the housing 6 and is attached to the base 7 and configured to be inflated by gas generated by the gas generator 9. The air-bag module 6 is configured to be mounted to a steering wheel so that the air-bag module defines a central portion of the steering wheel.

The housing 6 has an upwardly extending peripheral side wall 11, and the steering wheel comprises a frame housing an upwardly and outwardly extending wall 12 extending away from the side wall 11 of the housing. However, it is also envisaged that the wall 12 could be defined by part of the foam covering commonly used for steering wheels. The upper edge of the outer wall 12 is formed into a guide pin 13 which is of substantially H-shaped cross-section. The upper part of the guide pin 13 is configured to be engaged by a generally cylindrical mounting part 14 which is formed integrally with the lower surface of a substantially planar design element 15. The mounting part 14 engages and surrounds the upper part of the guide pin 13 to mount the design element 15 to the wall 12.

The design element 15 defines an element which is fixed relative to the housing 6 to form part of an upper surface of the housing 6. The design element 15 has an inwardly-directed angled edge 16 which defines an edge of the design element 15 which is closest to the central axis of the air-bag unit 5. The edge 16 is angled at between substantially 20 to 60 degrees relative to the substantially planar upper surface of the design element 15. The function of the angled edge 16 will become clear from the description below.

The wall 11 extends upwardly above the point at which it is joined by the outer wall 12, into the interior of the housing 6 so that an upper part of the wall 11 defines an inner wall 17 positioned within the housing 6. The inner wall 17 extends around the edge of the folded air-bag 10 to retain the air-bag 10 in position within the housing 6.

Four hook shaped stop elements 18 (only two of which can be seen in FIG. 2) are formed integrally with the inner wall 17. The number of stop elements 18 formed integrally with the inner wall 17 corresponds to the number of spokes of the steering wheel to which the air-bag module 5 is to be mounted. Consequently, in other embodiments there may be a greater or fewer number of stop elements 18, depending upon the number of spokes of the steering wheel to which the air-bag module 6 is to be mounted.

The stop elements 18 protrude outwardly from the inner wall 17 on the side of the inner wall 17 remote from the air-bag 10. It is to be understood that the stop elements 18 define part of an air-bag cover arrangement in accordance with a preferred embodiment of the invention.

Each stop element 18 comprises a generally wedge shaped section 19 that slopes downwardly and outwardly from the inner wall 17. A downwardly depending portion 20 extends from the end of the stop member 18. Part of the underside of each stop member 18 defines a stopping face 21 which extends from the inner wall 17 to the downwardly depending portion 20.

A stepped support formation 22 is formed integrally with the lower edge of the inner wall 17 so as to protrude outwardly from the inner wall 17. The support formation 22 provides four spaced apart spring support platforms 23 (only two of which can be seen in FIG. 2) which are each positioned opposite a respective stop element 18. Each spring support platform 23 supports a respective helically wound compression spring 24 (only two of which can be seen in FIG. 2). The number of spring support platforms 23 and the number of springs 24 correspond to the number of stop elements 18. The function of the springs 24 will become clear from the description below.

A moveable cover 25 is moveably mounted to the housing 6 to provide a cover for the air-bag module 5 which covers the folded air-bag 10. The moveable cover 25 defines a moveable cover element which forms part of the air-bag cover arrangement of the preferred embodiment of the invention. The moveable cover 25 incorporates a generally circular planar cover portion 26 which extends over the folded air-bag 10. A side wall 27 extends perpendicularly downwardly from the cover portion 26 around the periphery of the cover portion 26. The side wall 27 extends around the inner wall 17 of the housing 6. Four biasing beams 28 (only two of which can be seen in FIG. 2) extend radially outwardly from the side wall 27 at spaced apart positions so that each of the biasing beams 28 extends over a respective one of the coil springs 24. Each of the springs 24 is normally held in compression between its corresponding biasing beam 28 and support platform 23, so that each spring 24 biases each biasing beam 28 upwardly.

Four apertures 29 are provided in the side wall 27 of the moveable cover 25, with each aperture 29 being positioned beneath a respective biasing beam 28. Each aperture 29 is dimensioned so that a respective stop element 18 extends through the aperture 29. The upward bias provided by the springs 24 on the moveable cover 25 biases the side wall 27 upwardly, but the lower edge of each aperture 29 engages the stopping face 21 of a corresponding stop element 18 to hold the moveable cover 25 in a rest position. The apertures 29 are each, however, dimensioned so that there is space above each stopping element 18 so that the moveable cover 25 may be pressed downwardly against the bias to, for instance, close one or more pairs of electrical contacts to sound the horn of the vehicle.

A split line 30 is formed in the cover portion 26, around the periphery of the cover portion 26, close to where the cover portion 26 joins the side wall 27 of the moveable cover 25. The split line 30 is configured to be ruptured by forces exerted against the cover portion 26 by the air-bag 10 as the air-bag 10 inflates. The split line 30 is positioned at the periphery of the cover portion 26 so that when the split line 30 ruptures, substantially all of the cover portion 26 is detached from the moveable cover 25, without leaving an overhanging part which might otherwise impede the inflation of the air-bag 10.

The cover portion 26 also incorporates a rib 31 which extends around the underside of the cover portion 26, adjacent the split line 30. The rib 31 serves to reinforce the cover portion 26 to minimise the chances of the cover portion 26 becoming deformed by the air-bag 10 when the air-bag 10 is inflated.

The junction between the cover portion 26 and the side wall 27 forms a corner which presents an angled edge 32 on its outer surface. The angle of the angled edge 32 is the same as the angle of the angled edge 16 of the design element 15. The angled edge 32 of the moveable cover 25 is thus angled at between substantially 20 to 60 degrees relative to the upper surface of the cover portion 26. The angled edge 16 of the design element 15 and the angled edge 32 of the moveable cover 25 are such that the edge of the design element 15 defines an overlapping part which overlaps the edge of the moveable cover 25. In this preferred embodiment, the angled edge 16 of the design element 15 overlaps the angled edge 29 of the moveable cover 25 by between substantially 0.5 mm to 5 mm.

The upward bias on the moveable cover 25 provided by the springs 24 results in the angled edge 32 of the moveable cover 25 being biased in a direction towards the overlapping part defined by the angled edge 16 of the design element 15. It is to be understood, however, that the stopping elements 18 hold the moveable cover 25 in the rest position so that the angled edge 32 of the moveable cover 25 does not actually contact the overlapping angled edge 16 of the design element 15. When the moveable cover 25 is held in the rest position, a gap 33 of between substantially 0.1 mm to 0.4 mm is present between the angled edge 32 of the moveable cover 25 and the angled edge 16 of the design element 15.

Holding the moveable cover 25 in the rest position by the stopping elements 18 so that the moveable cover 25 does not contact the design element 15 in this way minimises the chances of the moveable cover 25 exerting a force on the design element 15 which might otherwise deform the design element 15 to spoil the appearance of the air-bag module 5. The overlap of the edge of the design element 15 over the edge of the moveable cover 25 means that when the air-bag module 5 is viewed from above, (in the orientation shown in the drawings) the gap 33 between the moveable cover 25 and the design element 15 is not visible. Consequently, the upper surface of the moveable cover 25 and the upper surface of the design element 15 appear to define a continuous surface which is of neat appearance, to the driver of a vehicle in which this steering wheel-mounted air-bag module is provided Referring now to FIG. 4 of the accompanying drawings, an air-bag cover arrangement in accordance with a further embodiment of the invention is illustrated which is largely identical to the embodiments described above, but is also provided with a blocking member 34 which is provided on the side wall 27 of the moveable cover 25. The blocking member 34 is of generally wedge shaped cross-section and is positioned so as to protrude outwardly from the side wall 27 at a position spaced just below the design element 15 when the moveable cover 25 is in the rest position. The function of the blocking member 34 is to block the moveable cover 25 from moving upwardly above the edge of the design element 15. The possibility of one side of the moveable cover 25 moving upwardly in this manner may occur if only one side of the moveable cover 25 is pressed by a user such that the cover 25 is caused to tilt, resulting in the opposite side being lifted. The blocking member 34 thus serves to minimise the possibility of the moveable cover 25 exerting an upward force on the design element 15 which may otherwise deform the design element 15, by contacting the undersurface of the design element, and resisting further upwards movement of the cover.

Whilst in the embodiments described above, there is a moveable cover 25 which is moveably mounted to an air-bag module 5, in other embodiments a cover may be fixed relative to an air-bag module. In such embodiments, the air-bag module is moveably mounted to a steering wheel to define a "floating" air-bag module which may be pressed to sound the horn or a vehicle. In embodiments where the air-bag module is a floating air-bag module, the air-bag module still comprises a cover element which is moveable, and the cover element is positioned adjacent a design element which is fixed to the steering wheel. Part of the design element overlaps part of the cover element to define a neat appearance, but the air-bag module is held in a rest position in which the cover element does not contact the design element by a stop element which is mounted to part of the steering wheel and which engages part of the air-bag module to hold the air-bag module in the rest position.

When used in this specification and claims, the terms "comprises" and "comprising" and variations thereof mean that the specified features, steps or integers are included. The terms are not to be interpreted to exclude the presence of other features, steps or components.

The invention claimed is:

1. An air-bag cover arrangement comprising:
   a moveable cover element for covering an air-bag module; and
   a design element positioned adjacent the cover element, the design element having an overlapping part which overlaps part of the cover element;
   the cover element being moveable relative to the design element but held by a stop element in a rest position in which the cover element does not contact the overlapping part of the design element;
   wherein the cover element is biased by a biasing arrangement in a direction towards the overlapping part of the design element but held against the bias in the rest position by the stop element.

2. The air-bag cover arrangement according to claim 1, wherein the design element and the stop element are fixed to a housing of the air-bag module and the cover element is movably mounted to the housing, the stop element engaging the cover element to hold the cover element in the rest position.

3. The air-bag cover arrangement according to claim 2, wherein the cover element comprises a generally planar cover portion and a side wall, the side wall extending substantially perpendicularly from one side of the cover portion at a periphery of the cover portion, the side wall being provided with an aperture through which the stop element extends, the stop element engaging part of the side wall which defines the edge of the aperture to hold the cover element in the rest position.

4. The air-bag cover arrangement according to claim 3, wherein the side wall incorporates a blocking member which protrudes substantially perpendicularly from the side wall at a position adjacent the design element, to block the cover element from moving past the overlapping part of the design element.

5. The air-bag cover arrangement according to claim 1, wherein the cover element being fixed to an air-bag housing which is moveably mounted to a steering wheel, and the design element being a part of the steering wheel adjacent the air-bag module, the air-bag module being configured to move relative to the steering wheel when the cover element is moved relative to the design element, the stop element being defined by part of the steering wheel which engages part of the air-bag module to hold the air-bag module and the cover element in the rest position.

6. The air-bag cover arrangement according to claim 5, wherein the air-bag module incorporates a blocking member which protrudes from a sidewall of the air-bag module at a position adjacent the design element, to block the cover element from moving past the overlapping part of the design element.

7. The air-bag cover arrangement according to claim 1, wherein one side of the cover element and one side of the design element cooperate to form a substantially continuous surface, the edge of the cover element and an edge of the design element each being angled relative to the continuous surface so that at least part of the angled edge of the design element forms the overlapping part of the design element which overlaps at least part of the angled edge of the cover element.

8. The air-bag cover arrangement according to claim 7, wherein the edge of the cover element and the edge of the design element are each angled at between substantially 20 to 60 degrees relative to the continuous surface.

9. The air-bag cover arrangement according to claim 1, wherein the overlapping part of the design element overlaps the part of the cover element by between approximately 0.5 mm to approximately 5 mm when the cover element is in the rest position.

10. The air-bag cover arrangement according to claim 1, wherein a gap of between approximately 0.1 mm to approximately 0.4 mm is present between the part of the cover element and the overlapping part of the design element when the cover element is in the rest position.

11. The air-bag cover arrangement according to claim 1, wherein the cover element incorporates a split line which is configured to rupture upon actuation of the air-bag module to provide an opening in the cover element out of which an air-bag may inflate.

12. The air-bag cover arrangement according to claim 6, wherein the cover element comprises a generally planar cover portion and the split line extends around the periphery of the cover portion.

13. An air-bag cover arrangement comprising:
 a moveable cover element for covering an air-bag module; and
 a design element positioned adjacent the cover element, the design element having an overlapping part which overlaps part of the cover element;
 the cover element being moveable relative to the design element but held by a stop element in a rest position in which the cover element does not contact the overlapping part of the design element;
 wherein one side of the cover element and one side of the design element cooperate to form a substantially continuous surface, the edge of the cover element and an edge of the design element each being angled relative to the continuous surface so that at least part of the angled edge of the design element forms the overlapping part of the design element which overlaps at least part of the angled edge of the cover element.

14. An air-bag cover arrangement comprising:
 a moveable cover element for covering an air-bag module; and
 a design element positioned adjacent the cover element, the design element having an overlapping part which overlaps part of the cover element; the cover element being moveable relative to the design element but held by a stop element in a rest position in which the cover element does not contact the overlapping part of the design element;
 wherein the cover element incorporates a split line which is configured to rupture upon actuation of the air-bag module to provide an opening in the cover element out of which an air-bag may inflate.

* * * * *